June 3, 1952        R. M. BUKATY        2,599,229
WORK COIL
Filed March 30, 1948
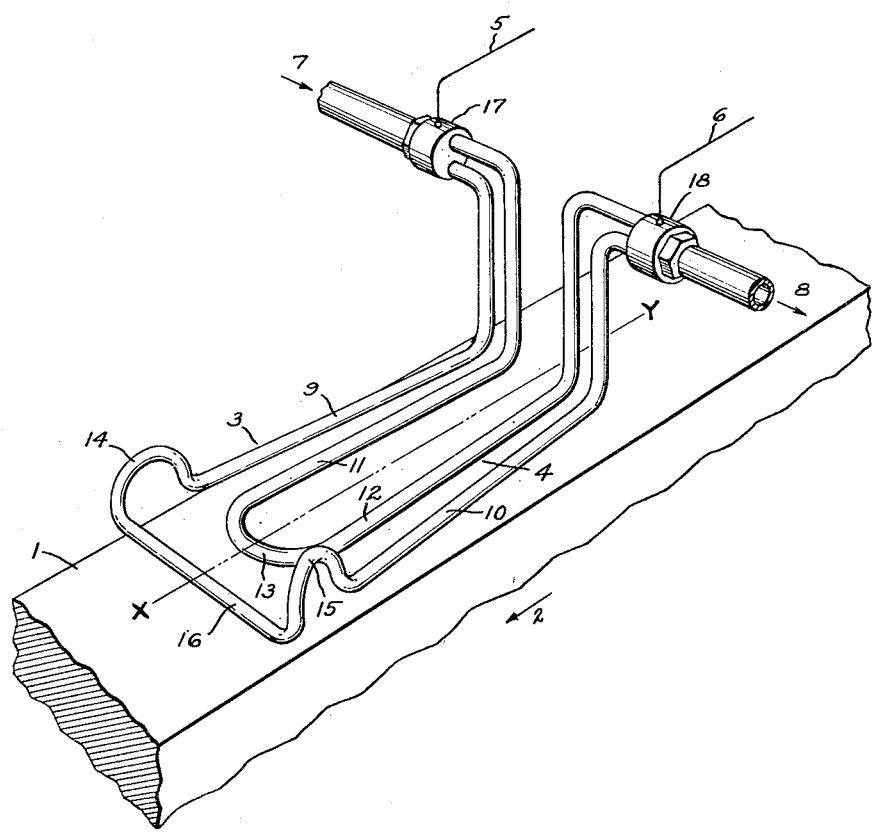
Inventor:
Raymond M. Bukaty,
by Claude H. Mott
His Attorney.

Patented June 3, 1952

2,599,229

UNITED STATES PATENT OFFICE 2,599,229

WORK COIL

Raymond M. Bukaty, Montclair, N. J., assignor to General Electric Company, a corporation of New York Application March 30, 1948, Serial No. 18,010

9 Claims. (Cl. 219—47)

My invention relates to induction heating apparatus, and more particularly to induction heating for the continuous hardening of metal parts, and has for its purpose a simple, reliable and compact induction heating apparatus.

More specifically, my invention relates to continuous surface heating and hardening of massive metal parts by means of high frequency induction heating where the metal of the workpiece is such that it requires a heat soaking period before heating to decalescent temperature as part of the hardening process. The workpiece and the heating coils are moved relatively so as progressively to heat the workpiece. After such heating the metal is separately quenched or is allowed to cool by internal conduction and dissipation of heat into the large body of the workpiece which occurs quickly as the heated area passes the heat source.

Previously, this soaking and heating was accomplished by the use of an elongated spiral coil parallel to the surface of the moving workpiece, one-half of which coil covered the workpiece while the other half was suspended in air and was doing no useful work. Also, due to configuration, this coil necessarily contained proximate parallel straight elements of sections of the coil with reverse currents causing opposite induced currents in the workpiece thus tending to nullify the total heating effect, and lessening the efficiency of the heater.

The object of my invention is to provide an improved inductive heating apparatus that supplies the heat soaking period necessary in the hardening of certain metals of which cast iron is an example, as well as the heat necessary to the hardening process.

My invention accomplishes this result by the use of a heating inductor which includes a plurality of particularly designed coils, each symmetrical about a common axis, such axis being in a plane with the center of the workpiece. The straight elements of all the coils are disposed in a common plane diverging from the line of beginning of inductive engagement with the workpiece. To prevent the burning of the sharp edges of the metal, the inner of such coils provides the greater part of the necessary soaking heat, while the outer coil, along its straight elements supplies the remainder of the soaking heat. Therefore, as the workpiece arrives under the straight end element of the outer coil which is transverse to and parallel to the surface of workpiece, the heat is unevenly distributed through the metal. This straight end element is disposed closer to the surface of workpiece than are the other straight elements, and its function is to bring the workpiece to even decalescent temperature from edge to edge.

A further advantage of this apparatus is that a deeper penetration of heat can be obtained with a plurality of coils used in parallel connection, than is possible if but one coil were used, since more heat can be supplied at a temperature below the burning point of the metal in the workpiece.

For a more complete understanding of my invention, reference is made to the accompanying perspective drawing of the position of the induction coils with respect to the workpiece.

Referring to the drawing, I have shown my invention in one form as applied to heating in the process of surface hardening of a massive workpiece comprising a metal that requires a heat soaking period prior to heating to the decalescent temperature. It is desired to harden a wearing surface layer on the workpiece 1 moving in the direction of the arrow 2. In accordance with my invention, I heat the surface of the workpiece by induction currents set up in the workpiece by symmetrical induction coils 3 and 4 formed from electrically conducting hollow or tubular material such as ¼" copper tubing, each shaped substantially in the form of a hairpin loop and extending in the direction of travel of the workpiece. Initial inductive contact occurs in the region of the open ends of the coils.

The workpiece and heating coils are mounted on suitable supporting means (not shown) for relative motion with respect to each other so that during the heating operation the coils pass continuously at a uniform speed along the surface of the workpiece being treated in parallel spaced relation therewith. Generally, I prefer to move the workpiece because the flexible leads requisite for moving coils of high frequency have high power losses incident thereto. The scanning speed is selected to provide for the gradual heating to the hardening temperature of the surface layer to the desired depth.

During the heating operation current is introduced to the coils from supply connections 5 and 6 at a suitable high frequency such as 540,000 cycles per second. Also a cooling fluid, preferably water, is circulated through the hollow conductor of the coils, as indicated by the arrows 7 and 8 for the purpose of cooling the coils.

The heat induced in a body must be generated at a temperature below the burning temperature of the metal of that body. In my apparatus two parallel coils are used instead of one, allowing heat to be induced simultaneously in more sections of the workpiece without exceeding the burning temperature of the metal than could be obtained with a single coil, thus insuring a deeper penetration of the surface.

The coils 3 and 4 are mounted with a common axis x—y disposed in the direction of travel 2 of the workpiece. Straight leg elements 9 and 10 of coil 3 and the whole of the effective inductive length of coil 4, which consists of straight elements 11 and 12 and curved bight portion 13, lie in a common plane. The straight leg elements 9, 10, 11 and 12 diverge from the common axis beginning at the transverse line of first inductive engagement between the coils and the workpiece towards the closed bight portions of the coils. The straight leg elements of coil 3 end in two vertical loop elements, 14 and 15 which begin substantially at the beginning of curvature of bight portion 13 of the inner coil and extend beyond coil 4. These non-planar loops are provided because of their comparatively low inductive heating effect on the workpiece to prevent excessive heating of the metal as the workpiece passes the high inductive loop 13 of coil 4, and also to provide a conductor to the straight end element 16 of coil 3. This transverse straight end element 16 is disposed parallel to the common plane of the other straight elements, and nearer to the surface of the workpiece. A space is provided between the closed bight portions of both coils to allow temperature equalization before final heating. Substantially at the line of beginning of inductive contact between the coils and the workpiece, the ends of both coils are bent out of the common plane and are connected to headers 17 and 18 which provide support for the heating members.

This heat treatment is designed for workpieces of great length as well as of massive cross-section so the application of heat and quench fluid to the workpiece is a continuous process from the beginning to the end of each individual workpiece. For clarity, one transverse section of the workpiece will be considered as it is heated by the coils to the desired decalescent temperature.

As this section of the workpiece enters the region of inductive contact with the apparatus, coils 3 and 4 begin to induce heat at the center of the section. Of the two coils 3 and 4, the inner coil 3 being somewhat shorter and consequently having less impedance, will draw more current and therefore will induce heat in the section at a greater rate than will the outer coil.

As the section moves forward, heat is induced gradually outward from the center by the four side by side straight elements 9, 10, 11 and 12 until the section arrives at the beginning of the bight portion 13 of coil 4. From this point to the end of coil 4 heating is induced by the element 13 plus the negligible heat induced by vertical loops 14 and 15 of coil 3. Upon passing coil 4, the heat is unevenly distributed over the transverse section of the workpiece but tends to equalize in the short distance between coil 4 and the straight end element 16 of the bight portion of coil 3, which then brings the section to the uniform decalescent temperature required before quenching.

A feature of my invention is that the induction of heat in any section begins at the center and extends gradually toward the edge to prevent burning of the edges of the workpiece. In this way the material of the workpiece is not allowed to arrive at dangerously high temperature until brought to the decalescent temperature by induction from the straight member 16.

The length of the soaking period is the elapsed time while a section traverses from the point of first inductive contact until it passes element 13, and is dependent upon the length of the coils and the speed of the workpiece. These values may be varied for different metals.

What I claim as new and desire to secure by Letters Patent of the United States is:

1. An induction heating apparatus for use in the continuous surface hardening of metals requiring a comparatively long soaking heat, including a heating inductor arranged for relative movement with respect to a workpiece, said inductor comprising a plurality of substantially co-planar high frequency hairpin-shaped coils substantially symmetrically disposed one within another about a common axis and disposed with said axis in the direction of said relative movement and substantially parallel to the surface of said workpiece for providing the necessary soaking heat and a transversely disposed bight portion forming a part of the outermost of said coils for raising the temperature of said surface to a predetermined uniform value, said transversely disposed portion being spaced from the bight portion of the adjacent coil and from the legs of said outermost coil by non-planar connections between said transversely disposed portion and said legs.

2. An induction heating apparatus comprising a heating inductor for use in connection with the continuous heating of metals requiring a comparatively long soaking heat, constructed for relative movement with respect to a workpiece, comprising a plurality of co-planar high frequency coils each substantially symmetrical about a common axis and disposed with said axis in the direction of said relative movement and substantially parallel to the surface of said workpiece, said coils being positioned one within another, each coil being provided with two straight elements diverging from said common axis away from the region of initial inductive contact with the workpiece and a bight portion connecting the diverging ends of the elements to complete the coil, said coils forming an effective planar source of soaking heat, the bight portion of the outermost of said coils comprising a transversely disposed portion substantially parallel to the surface of said workpiece for raising the temperature of the surface of said workpiece to a predetermined uniform value, said transversely disposed portion being connected to the diverging ends of the straight elements in a manner such that said transversely disposed portion is spaced from the bight portion of the adjacent coil.

3. An induction heating apparatus comprising a heating inductor for use in connection with the continuous hardening of metals requiring a comparatively long soaking heat, constructed for relative movement with respect to a workpiece, comprising a plurality of co-planar high frequency substantially hairpin shaped coils symmetrically disposed one within another about a common axis and disposed with said axis in the direction of said relative movement and substantially parallel to the surface of said workpiece, said coils being of progressively greater impedance from the inner to the outer of said coils to provide a higher rate of induction nearer the center of the workpiece to insure against burning of the sharp edge of the workpiece, each said coil being provided with two straight elements diverging from the common axis away from the line of initial inductive contact with the workpiece and a bight portion connecting the diverging ends of said straight elements, said coils forming an effective planar source of soaking heat, the bight portion of the outer coil including a transverse straight end element substantially parallel to and nearer to the surface of said workpiece as the source of heat necessary to raise the workpiece progressively to an even decalescent temperature, said transverse element being connected to the straight elements by a pair of vertically disposed loops whereby said transverse element is effectively spaced from the straight elements and from the bight portion of the adjacent coil to allow an interval for temperature equalization of the surface of said workpiece before said transverse element becomes effective.

4. An induction heating apparatus comprising a heating inductor for use in connection with the continuous hardening of metals requiring a comparatively long soaking heat, constructed for relative movement with respect to a workpiece, comprising a plurality of substantially co-planar high frequency substantially hairpin-shaped coils symmetrically positioned one within another about a common axis and disposed with said axis in the direction of said relative movement substantially parallel to the surface of said workpiece, the inner of said coils being of progressively greater inductance than the outer of said coils to provide a higher rate of induction nearer the center of the workpiece as insurance against burning of the sharp edge of the workpiece, said inner coil provided with a high inductive transverse curved end element, said outer coil provided with two low inductance vertical loop elements disposed transversely opposite said curved end element and extending beyond said inner coil and a transverse straight element connected between said loop elements, said loop elements acting as low inductive conductors to carry the current of the said outer coil past said high inductive curve element to said transverse straight element to obviate danger of overheating the metal as the workpiece traverses said curve element, said transverse straight element providing the heat necessary to raise the workpiece progressively to an even decalescent temperature.

5. An induction heating apparatus for use in the heating of metals, comprising two substantially hairpin shaped coils connected in parallel, one inside the other and shorter to carry more current, each being provided with two straight sides disposed substantially in a common plane and with both coils extending to their closed ends in the direction of relative movement to a workpiece, the closed ends of said coils being spaced apart in said direction of movement to provide a temperature equalizing period during traverse of the workpiece between said closed ends, and the outer of said coils being provided with a straight closed end element disposed nearer to the workpiece surface than said common plane in order finally to raise the workpiece to an even desired temperature, said element being connected to the two straight sides of the outer coil by a pair of vertically disposed loops whereby said end element is effectively spaced from the straight sides of the outer coil and from the closed end of the inner coil to allow an interval for the surface temperature of the workpiece to be equalized by conduction before said end element becomes effective.

6. An induction heating apparatus for use in connection with the heat treatment of metals requiring a soaking heat, comprising two substantially hairpin shaped coils connected in parallel, one inside the other and shorter to carry more current, each being provided with two straight sides disposed substantially in a common plane and with both coils extending to their closed ends in the direction of relative movement of the workpiece, a space being provided between the closed ends of said coils extending in said direction of movement to provide a temperature equalizing period during traverse of the workpiece between said closed ends, the portion of said coils traversed before the said space providing the soaking heat and the portion traversed following the space providing the final heat necessary to bring the workpiece to a final even decalescent temperature, the end portion of said outer coil being connected to the straight sides of this coil by a pair of vertically disposed loops whereby substantially no heat is imparted to the workpiece in the said space between the end portions of the two coils.

7. An induction heating apparatus comprising a heating inductor for use in connection with the continuous hardening of metals requiring a comparatively long soaking heat, constructed for relative movement with respect to a workpiece, comprising two substantially hairpin-shaped coils symmetrically disposed one within another about a common axis and disposed with said axis in the direction of said movement and substantially parallel to the surface of said workpiece, the outer of said coils having a greater electrical impedance than the inner coil to provide a higher rate of induction nearer the center of the workpiece as insurance aginst burning of the sharp edge of the workpiece, each coil being provided with two straight elements diverging outward from the common axis away from the line of initial inductive contact with the workpiece, the said two straight elements of the inner coil connected by a curved end element, said curved element and the said straight elements of both coils forming an effective planar source of soaking heat, said straight elements of said outside coil being connected to a transverse straight end member by two low inductance vertical loop elements transversely opposite the curved end element of said inner coil and extending beyond said inner coil, acting as conductors to carry outer coil current past the said high inductance curved element of said inner coil to prevent burning as the workpiece traverses said curved element, said transverse element of said outer coil being furnished to provide the heat necessary to raise the workpiece progressively to an even decalescent temperature.

8. A heating inductor comprising, a pair of heating coils connected in parallel for energization by a common source of electrical current, each of said coils having a pair of straight leg portions, all four of said leg portions being located side by side in divergent co-planar relation, a bight portion joining the diverging ends of the inner pair of said leg portions to close one of said coils, and a transversely disposed bight portion parallel to the plane of said leg portions connecting the diverging ends of the outer pair of leg portions to close the other of said coils, said transversely disposed portion being spaced from the bight portion of the innermost coil and from the leg portions of said outermost coil by nonplanar connections between said transversely disposed portion and said outer leg portions.

9. A heating inductor comprising a pair of heating coils arranged in substantially symmetrical relation one within the other, each of said coils having a pair of substantially straight leg portions, all four of said leg portions being located side by side in co-planar relation, a bight portion joining the ends of the inner two leg portions at one extremity to close one of said coils, and a transversely disposed bight portion substantially parallel to the plane of said leg portions joining the ends of the outer two leg portions at the same extremity to close the other of said coils, said transversely disposed portion being spaced from the innermost coil and from the leg portions of the outermost coil by nonplanar connections between said transversely disposed portion and said outer two leg portions.

RAYMOND M. BUKATY.

REFERENCES CITED

The following references are of record in the file of this patent:

UNITED STATES PATENTS

| Number | Name | Date |
|---|---|---|
| 1,900,842 | Northrup | Mar. 7, 1933 |
| 2,024,906 | Bennett | Dec. 17, 1935 |
| 2,371,459 | Mittlemann | Mar. 13, 1945 |
| 2,385,904 | Witty | Oct. 2, 1945 |
| 2,401,899 | Bierwirth et al. | June 11, 1946 |
| 2,419,116 | Cassen et al. | Apr. 15, 1947 |
| 2,448,009 | Baker | Aug. 31, 1948 |
| 2,448,011 | Baker et al. | Aug. 31, 1948 |
| 2,460,687 | Fuchs | Feb. 1, 1949 |
| 2,479,341 | Gehr et al. | Aug. 16, 1949 |
| 2,493,950 | Dow et al. | Jan. 10, 1950 |

OTHER REFERENCES

Curtis, "High-Frequency Induction Heating," 1st ed., McGraw-Hill Book Co., Inc., New York, 1944, pages 75-76.